United States Patent [19]

Fukui et al.

[11] 4,156,274
[45] May 22, 1979

[54] INVERTER CIRCUIT

[75] Inventors: Yukio Fukui, Harajukumachi; Katunobu Takeda, Totsukamachi, both of Japan

[73] Assignee: Hitachi, Ltd., Japan

[21] Appl. No.: 848,648

[22] Filed: Nov. 4, 1977

[30] Foreign Application Priority Data

Nov. 5, 1976 [JP] Japan .................. 51-132409

[51] Int. Cl.² ........................... H02M 1/18
[52] U.S. Cl. ........................ 363/58; 363/96; 363/136
[58] Field of Search ........... 307/252 M; 363/57, 58, 363/135–138, 96

[56] References Cited

U.S. PATENT DOCUMENTS

| Re. 26,342 | 2/1968 | Bedford | 363/138 |
|---|---|---|---|
| 3,325,720 | 6/1967 | Stumpe | 363/135 |
| 3,343,068 | 9/1967 | Studtmann et al. | 363/135 |
| 3,609,511 | 9/1971 | Risberg | 363/137 X |

Primary Examiner—William M. Shoop
Attorney, Agent, or Firm—Craig and Antonelli

[57] ABSTRACT

An inverter circuit comprises a reactor and a capacitor connected in series to a load to supply the load with a series resonance high-frequency power, a secondary winding provided at the reactor, and means for feeding a voltage generated in the secondary winding back to a power supply through switching means of a thyristor. The switching means is made conductive to feed the voltage generated in the secondary winding back to the power supply when supply voltage detecting means detects that a supply voltage exceeds a predetermined voltage.

12 Claims, 6 Drawing Figures

F I G. 4
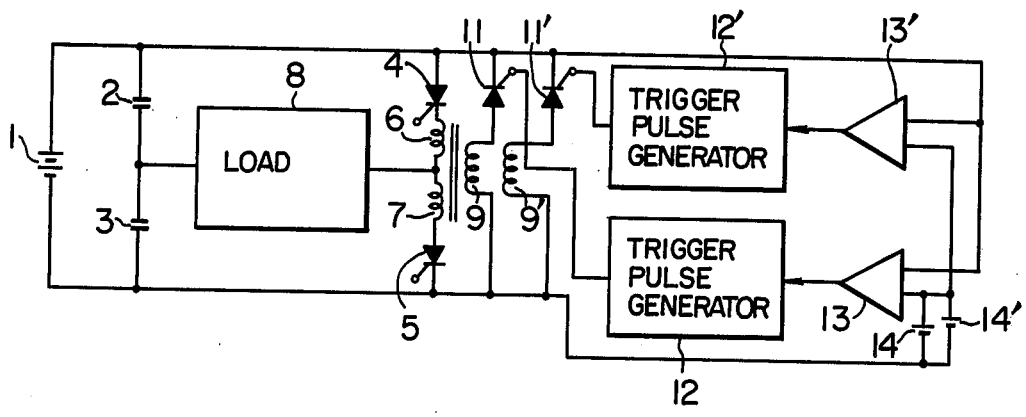
F I G. 5
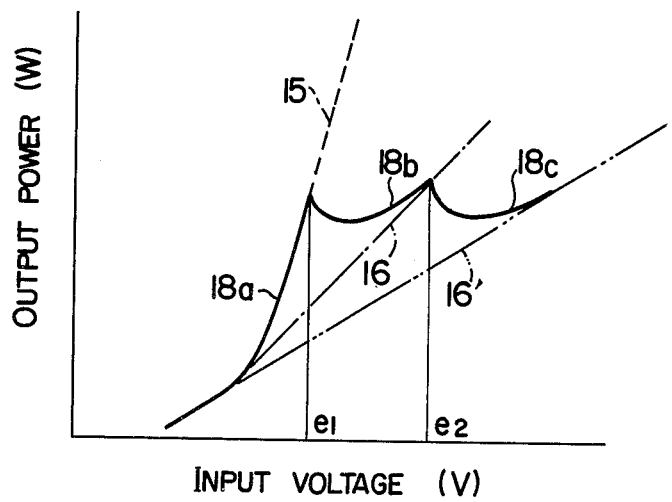

INVERTER CIRCUIT

LIST OF PRIOR ART REFERENCE (37 CFR 1.56 (a))

The following reference is cited to show the state of the prior art.

"Design of a Silicon Controlled Rectifier High-Frequency Inverter", SEMICONDUCTOR PRODUCTS, September 1962, pages 24A to 24D.

BACKGROUND OF THE INVENTION

The present invention relates to an inverter circuit, and more particularly to an inverter circuit which operates stably irrespective of a great fluctuation in input voltage.

It is well known that switching elements such as thyristors, SCRs (Silicon Controlled Rectifiers), and the like (hereinafter referred to as thyristors) are adapted for use in an inverter circuit. There is a known prior art inverter circuit, for example, with the thyristor including a load which is connected in series to a reactor and a capacitor. This circuit provides for the supply of the load with a high-frequency power with the aid of the series resonance of the reactor and capacitor. The use of the series resonance of LC, however, causes the problem that the fluctuation of the load to a great impedance causes an excessive current to be produced and to flow into the thyristor with the result of the possible destruction thereof. Thus, such an inverter circuit of the series type has the drawback of a small allowance relative to the load fluctuation. It is, therefore, difficult to make use of the inverter circuit for a power supply circuit which supplies a power to a non-linear load such as an element with Zener characteristics having its impedance abruptly changed depending upon a voltage applied thereto.

A prior art circuit such as shown in FIG. 1 has been proposed to improve the series inverter circuit for application to a load with the great fluctuation. A DC supply 1 in FIG. 1 is, for the most part, a power supply obtained by rectifying a commercial AC supply.

In this circuit, thyristors 4 and 5 are alternately turned on and off to supply a load 8 with a high-frequency current A resulting from the resonance of capacitors 2 and 3 and a reactor 6 when the thyristor 4 is turned on, and to supply the load 8 with a high-frequency current B resulting from the resonance of the capacitors 2 and 3 and a reactor 7 when the thyristor 5 is turned on, thereby supplying the load 8 with a high-frequency power. For improvement against the above-mentioned drawback, the reactors 6 and 7 are provided with a secondary winding 9, which is connected to the power supply 1 through a diode 10. The fluctuation of the load 8 to a small impedance to increase the high-frequency currents A and B causes an increase of a voltage induced to the secondary winding provided at the reactors 6 and 7. The exceeding of the induced voltage over a voltage of the power supply 1 causes the diode 10 to be conductive. This forms a feedback circuit which feeds a portion of the high-frequency currents A and B flowing into the load 8 back to the power supply 1, and thus suppresses the increase in high-frequency current to prevent the destruction of the thyristors 4 and 5.

An increase in the voltage of the power supply 1 in the circuit of FIG. 1, however, requires an increase in the voltage induced in the secondary winding by so much in order to bring the feedback circuit of the secondary winding 9 and the diode 10 into operation. This results in the excessive high-frequency currents A and B.

If the power supply 1 is not formed by a cell, but obtained by rectifying the commercial AC supply without any voltage stabilizer, then the fluctuation of the output voltage from the power supply 1 is expected to be great. To prevent this, the number of turns of the secondary winding 9 may be increased to make the induced voltage great. In this case, however, the feedback circuit is disadvantageously operated even at a small voltage of the power supply 1, so that the load 8 cannot be supplied with a predetermined high-frequency power at the low supply voltage.

As mentioned above, in the conventional circuit as shown in FIG. 1, a stabilized constant voltage supply is needed to prevent the flow of the excessive current into the thyristor and to supply the load with the predetermined power. This, therefore, makes it difficult to make use of a power supply with a great fluctuation such as one which produces a pulsating voltage as obtained by rectifying the commercial power supply.

SUMMARY OF THE INVENTION

An object of the present invention is to provide an inverter circuit comprising a power supply with a great fluctuation in input voltage and a non-linear load having its impedance changed depending upon a level of a voltage applied thereto, wherein the load is stably supplied with a predetermined power and an excessive current is prevented from flowing into a thyristor.

In order to achieve the object, an inverter circuit according to the present invention comprises a secondary winding provided at a reactor, means for feeding back to a power supply a voltage produced in the secondary winding when a great current flows into a load, and control means for detecting a level of a supply voltage and controlling the feedback means in such a manner that it is made conductive when the supply voltage is greater than a predetermined level, and made non-conductive when the supply voltage is smaller than the level.

Thus, the present invention provides an inverter circuit which prevents an increase in thyristor current and the destruction of the thyristor with the aid of the feedback means at a large supply voltage and brings the feedback means out of operation at a low supply voltage to supply the load with a sufficient power. This allows the utilization of a DC supply with a great fluctuation and makes a whole inverter circuit inexpensive.

BRIEF DESCRIPTION OF THE DRAWINGS

FIG. 4 is a circuit diagram showing another example of the inverter circuit of the present invention.

FIG. 5 is a graph showing a relation between an input voltage and an output power for illustrating operations of the circuit in FIG. 4.

DESCRIPTION OF THE PREFERRED EMBODIMENTS

Figure 1:
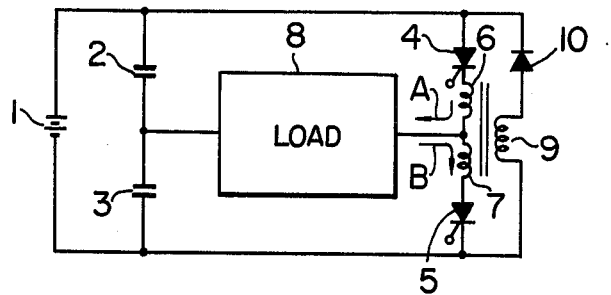
FIG. 1 is a circuit diagram showing one example of a conventional inverter circuit.
Figure 2:
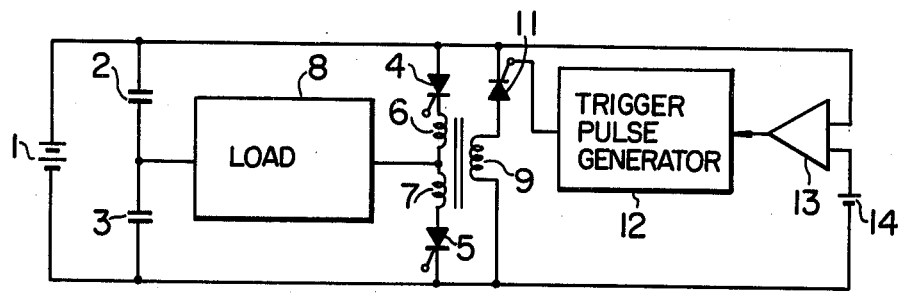
FIG. 2 is a circuit diagram showing one example of an inverter circuit according to the present invention.

FIG. 2 shows one embodiment of the present invention in which elements having the same function as those in the circuit of FIG. 1 are provided with the same marks. In FIG. 2, the secondary winding 9 cooperates with a thyristor 11 connected thereto to constitute a feedback circuit. A comparator 13 compares a voltage of a reference power supply 14 with a voltage from the power supply 1. A trigger pulse generator 12 connected to the output of the comparator 13 is connected to the gate of the thyristor 11. The comparator 13 produces a signal voltage when the voltage of the power supply 1 is greater than the reference voltage 14, and the trigger pulse generator 12 applies a trigger pulse to the gate of the thyristor 11 in response to an output from the comparator 13. Thus, the thyristor 11 is made conductive to operate the feedback circuit only when the voltage of the power supply 1 is greater than the reference voltage 14. In the circuit of the present invention, therefore, the feedback circuit does not operate and the load 8 is supplied with a predetermined high-frequency power when the voltage of the power supply 1 is lower than the reference voltage. When, on the other hand, the voltage of the power supply 1 is greater than the reference voltage and an excessive high-frequency current would be caused to flow, the thyristor 11 is conductive to operate the feedback circuit, thereby preventing the flow of the excessive current.

Figure 3:
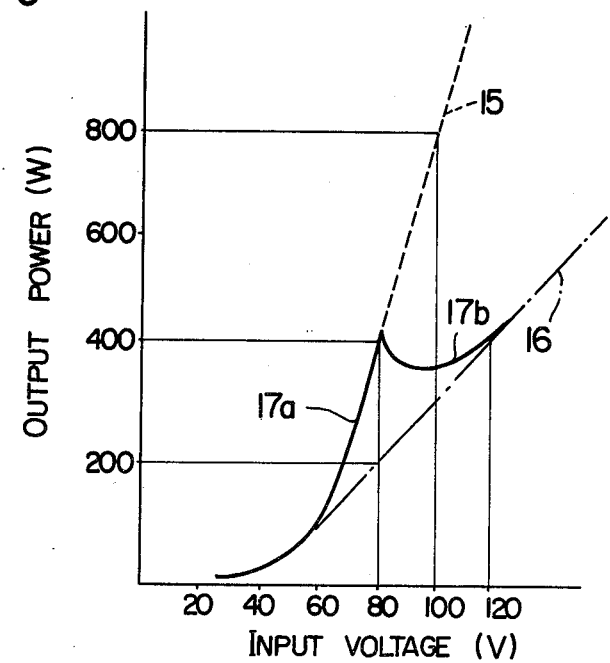
FIG. 3 is a graph showing a relation between an input voltage and an output power for illustrating operations of the inverter circuit according to the present invention.

FIG. 3 shows an experimental result obtained when a load having a characteristic in which its impedance is lowered when a voltage is above a certain level is driven by a power supply, i.e., a pulsating power supply provided by rectifying the commercial power supply. The graph of FIG. 3 shows an input voltage on its abscissa and an output supplied to the load on its ordinate.

A curve indicated by a solid line 17a and the following dot line 15 shows a relation between the input voltage and the output power without any feedback circuit. This shows that a predetermined output power of, for example, about 400 W is produced at an input supply voltage of 80 V, and that the output power abruptly increases with the greater supply voltage with a power of 800 W at 100 V, twice as great, and with a power over 1000 W at 120 V. A curve 16 indicated by a dot-dash line shows a characteristic of a circuit including the feedback circuit of the conventional diode and the secondary winding to suppress the increase in load current so that, for example, the output voltage may not exceed the predetermined level of 400 W even at the input supply voltage of 120 V. This, however, causes a voltage appearing on the secondary winding and initiating the feedback to also drop with the reduction of the supply voltage, so that the feedback occurs even at the low supply voltage with the result of an output power of the order of 200 W, not reaching the required power, at the supply voltage of 80 V as shown by the curve 16.

A curve 17b shown by a solid line shows a relation between the input voltage and the output voltage, and operations of the circuit according to the embodiment of the present invention as shown in FIG. 2. The curve 17b shows a characteristic of the circuit of FIG. 2 in which the voltage of the reference power supply is so set that the comparator 13 produces an output signal when the voltage of the power supply 1 is of the order of 80 V. Thus, the feedback circuit does not operate at the voltage of the power supply 1 lower than 80 V, so that the input voltage is related to the output power as shown by 17a at the supply voltage below 80 V. In the range of the supply voltage above 80 V, the thyristor 11 is made conductive to bring the feedback circuit out of operation, so that the relation between the input voltage and the output voltage is characterized by the curve 17b which approximates to the curve 16. In this way, in the circuit of FIG. 2, a fluctuation of the supply voltage by ±20% about 100 V only causes a slight fluctuation of the output power about the required power of 400 W. This allows the stable supply of the power to the load, and prevents the flow of the excessive current with the result of no fear of destructing the thyristors 4, 5.

FIG. 4 is a circuit diagram showing another embodiment of the present invention, which has a more expanded allowance of the supply voltage fluctuation than the circuit as shown in FIG. 2. FIG. 5 shows its operation characteristic. The circuit in FIG. 4 includes an additional feedback circuit similar to the feedback circuit comprising the reference power supply 14, comparator 13, trigger pulse generator 12, thyristor 11 and secondary winding 9. A secondary winding 9' has the number of turns greater than the secondary winding 9. The reference power supply 14 is so set that the comparator 13 may produce an output signal when the voltage of the power supply 1 reaches a level $e_1$, and a reference power supply 14' is so set that a comparator 13' may produce an output signal when the voltage of the power supply 1 reaches a level $e_2$ (greater than $e_1$). Thus, the circuit of FIG. 4, as shown in FIG. 5, has an output characteristic between the input voltage and the output power, which is similar to the characteristic of the curve 15 at the voltage of the power supply 1 lower than the level $e_1$, and approaches to the characteristic of the curve 16 at the voltage of the power supply 1 greater than the level $e_1$ because of the operation of the feedback circuit including the secondary winding 9 and the thyristor 11, and, at the voltage of the power supply 1 greater than the level $e_2$, to the characteristic of a curve 16' because the feedback circuit including the secondary winding 9' and a thyristor 11' operates. Thus, this provides a characteristic as shown by curves 18a, 18b, 18c, and a wider range of allowance relative to the fluctuation in power supply. It will be apparent that, with a plurality of sets of such feedback circuits, the fluctuation in output power is made smaller and the range of allowance relative to the input voltage is made wider.

Figure 6:
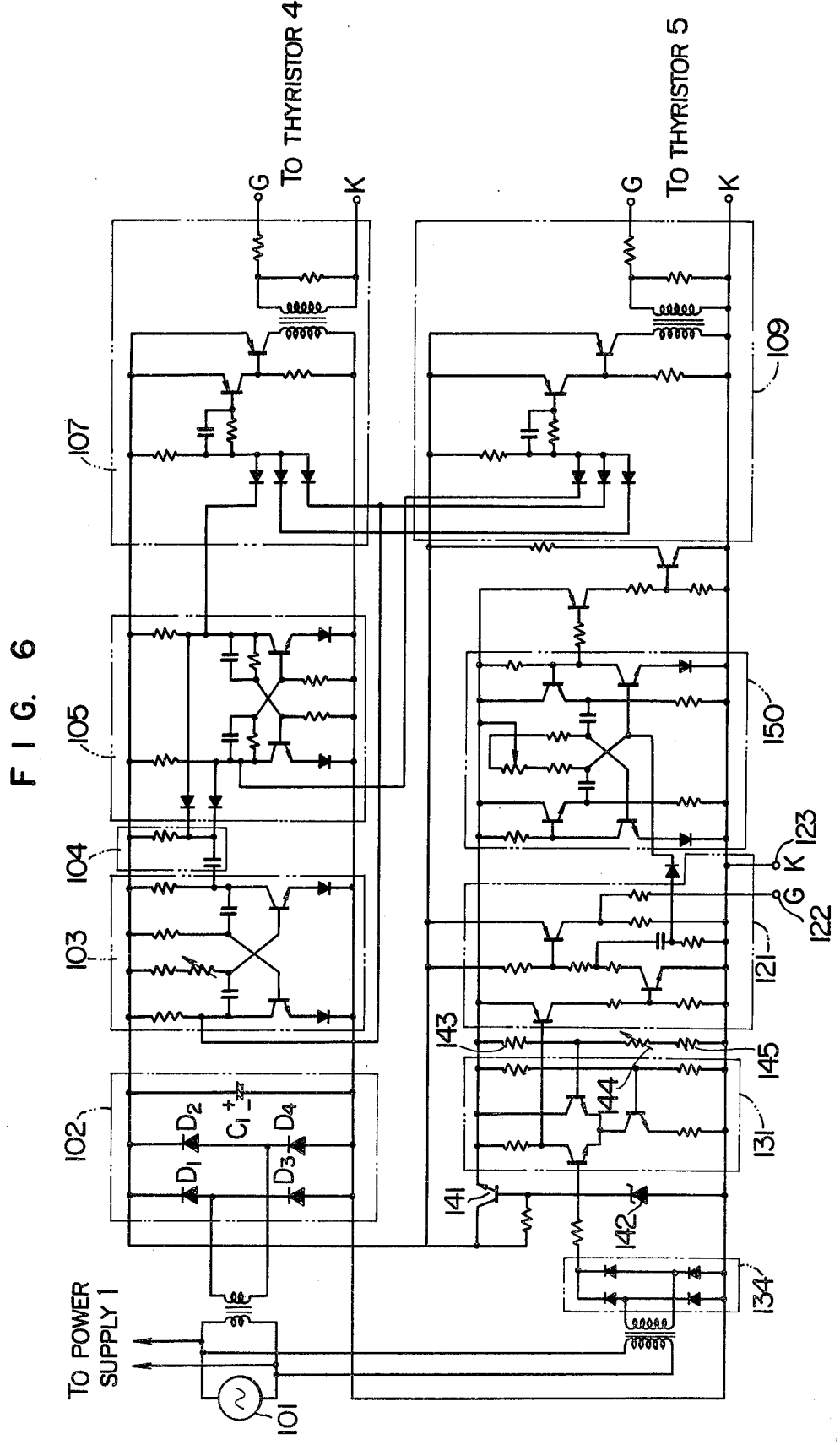
FIG. 6 is a circuit diagram showing one example of particular control circuits for thyristors 4, 5 and a thyristor 11 when the inverter circuit shown in FIG. 2 is used for a power supply for an electronic range.

FIG. 6 shows a particular embodiment of a control circuit in which the inverter circuit of the present invention is applied to a power supply for an electronic range. In the circuit in which the inverter circuit as shown in FIG. 2 is used as the power supply for the electronic range there are respectively shown particular arrangements of a circuit for triggering the gates of the thyristors 4 and 5, the trigger pulse generator 12 for triggering the gate of the thyristor 11, the comparator 13, and the reference power supply 14.

A commercial AC supply 101 is rectified by a rectifier (not shown) to provide the power supply 1. An AC power from the power supply 101 is supplied to a DC supply 102 comprising a full-wave rectifier of four diodes $D_1$ to $D_4$ and a smoothing capacitor $C_1$. The DC supply 102 serves to operate each circuit in FIG. 6. An oscillator 103 comprising a multivibrator oscillates at a frequency of several tens KHz. The oscillator 103 serves to operate a flip-flop circuit 105 through a differentiation circuit 104. Alternating output signals from the flip-flop circuit 105 are respectively applied to thyristor drivers 107 and 109. An output from the thyristor driver 107 is applied between the gate and cathode of the thyristor 4 in FIG. 2, and an output from the thyristor driver 109 is applied between the gate and cathode of the thyristor 5. Thus, the thyristors 4, 5 are made conductive at a frequency half as great as the frequency of the oscillator 103 to operate the inverter.

A comparator 131 comprising a differential amplifier receives at its input a pulsating voltage produced by rectifying the voltage of the AC supply 101 by means of a full-wave rectifier 134. It will be understood that the pulsating voltage is proportional to the voltage of the power supply 1 at a certain ratio. The comparator 131 receives a reference voltage at the other input. The reference voltage is set by dividing with resistors 143 and 145 and a variable resistor 144 a voltage which is produced by stabilizing the output from the DC supply 102 by means of a transistor 141 and a Zener diode 142. If, for example, the feedback is desired to occur at the voltage of the power supply 1 above 80 V, then the reference voltage is so set by the variable resistor 144 as to be a voltage corresponding to an output voltage of the rectifier 134 when the voltage of the power supply 1 is 80 V. When the output voltage of the rectifier 134 applied to the rectifier 131 exceeds the reference voltage, the comparator 131 produces an output, which is applied to a thyristor driver 121 for driving the gate of the feedback thyristor 11 to generate a gate voltage between output terminals 122 and 123 of the thyristor driver 121. The output terminals 122 and 123 are connected to the gate and cathode of the feedback thyristor 11 with the thyristor 11 made conductive at a time during which it receives the gate voltage. Thus, an increase in the output voltage of the power supply 1 leads similarly to an increase of the output voltage from the rectifier 134 because the latter is also connected to the same AC supply 101. This allows the feedback thyristor 11 to be made conductive at a voltage above a certain level to suppress the power supplied to the load.

A low frequency oscillator 150, having nothing to do with aspects of the present invention, serves to control a microwave power output for the electronic range and to produce an output, which is applied to the thyristor drivers 107 and 109 to control a operating duration of the thyristors 4, 5 at the frequency and cycle set by the oscillator 150. This allows the control of the supply of power to the load 8, i.e., a magnetron oscillator in this case.

We claim:

1. An inverter circuit of a series type adapted to prevent an excessive current from flowing from a non-stabilized power supply into a load and a thyristor, comprising:
   a reactor and a capacitor connected in series to the load;
   a first thyristor connected in series to said reactor and effecting a switching operation in response to an externally applied control signal;
   a non-stabilized power supply for supplying power to said load in response to the switching operation of said thyristor;
   a secondary winding provided at said reactor;
   a second thyristor connected between said secondary winding and said power supply for feeding a voltage generated in the secondary winding back to said power supply; and
   control means for detecting a voltage of said power supply and making said second thyristor conductive when the detected voltage exceeds a predetermined level.

2. An inverter circuit according to claim 1, wherein said control means comprises:
   means for generating a preset reference voltage;
   a comparator for comparing the voltage of said power supply and the reference voltage and generating an output signal when the supply voltage is greater than the reference voltage; and
   a gate driver for applying to the gate of said second thyristor a voltage for making the second thyristor conductive when said comparator generates the output signal.

3. An inverter circuit according to claim 1, wherein said control means comprises:
   means for generating a preset reference voltage;
   means for generating a voltage proportional to a voltage of said power supply;
   a comparator for comparing the voltage from said voltage generating means with said reference voltage and generating an output signal when the voltage is greater than said reference voltage; and
   a gate driver for applying to the gate of said second thyristor a voltage for making said second thyristor conductive when said comparator generates the output signal.

4. An inverter circuit of a series type adapted to prevent an excessive current from flowing from a non-stabilized power supply into a load and a thyristor, comprising:
   a reactor and a capacitor connected in series to the load;
   a first thyristor connected in series to said reactor and effecting a switching operation in response to an externally applied control signal;
   a non-stabilized power supply for supplying power to the load in response to the switching operation of said first thyristor;
   a plurality of secondary windings provided at said reactor;
   a plurality of second thyristors each connected between each of said secondary windings and said power supply for feeding a voltage generated in said secondary windings back to said power supply; and
   control means for detecting a voltage of said power supply and making ones of said second thyristors conductive when the detected voltage exceeds a plurality of different levels each preset corresponding to the thyristors made conductive.

5. An inverter circuit of a series type adapted to prevent an excessive current from flowing from a non-stabilized power supply into a load and a thyristor, comprising:
   a non-stabilized DC power supply;
   two and second thyristors connected in series to said DC supply and effecting an alternate switching operation in response to externally applied control signals;
   a reactor with an intermediate tap connected in series between said first two thyristors;
   two series-connected capacitors connected in parallel with a series connection of said reactor and said first and second thyristors;

a load connected between an intermediate connecting point of said two series-connected capacitors and the intermediate tap of said reactor;

a secondary winding provided at said reactor and connected in paralled with said DC supply through a third thyristor;

means for generating a preset reference voltage; and control means for comparing a voltage of said DC supply and said reference voltage and making said third thyristor conductive when the voltage of said DC supply is greater than said reference voltage.

6. An inverter circuit according to claim 1, wherein the non-stabilized power supply comprises an AC power supply rectified by a rectifier without smoothing to produce a non-stabilized DC voltage.

7. An inverter circuit according to claim 4, wherein the non-stabilized power supply comprises an AC power supply rectified by a rectifier without smoothing to produce a non-stabilized DC voltage.

8. An inverter circuit according to claim 5, wherein the non-stabilized DC power supply comprises an AC power supply rectified by a first rectifier without smoothing to produce the non-stabilized DC voltage.

9. An inverter circuit according to claim 8 further including means to generate the externally applied control signals to the first and second thryistors comprising:

a second rectifier coupled to the AC source to produce a DC voltage;

an oscillator coupled to the DC voltage output of said second rectifier;

a differentiation circuit coupled to the output of the oscillator;

a flip-flop circuit coupled to the output of the differentiation circuit to produce alternating output signals; and first and second thyristor drivers coupled between the flip-flop circuit and the first and second thyristors, respectively, to alternately make the first and second thryistors conductive at a frequency which is half of the frequency of the oscillator.

10. An inverter circuit of a series type adapted to prevent an excessive current from flowing from a non-stabilized power supply into a load and a thyristor, comprising:

a non-stabilized DC power supply;

first and second thyristors connected in series to said DC supply and effecting an alternate switching operation in response to externally applied control signals;

a reactor with an intermediate tap connected in series between said first two thyristors;

two series-connected capacitors connected in parallel with a series connection of said reactor and said first and second thyristors;

a load connected between an intermediate connecting point of said two series-connected capacitors and the intermediate tap of said reactor;

a plurality of secondary windings provided at said reactor and connected in parallel with said DC supply through a plurality of third thyristors, each connected between each of said secondary windings and said power supply for feeding a voltage generated in said secondary windings back to said power supply;

means for generating different preset reference voltages; and control means for detecting the voltage of the power supply and comparing the detected voltage of said DC supply and each of said reference voltages and making ones of said third thyristors conductive in accordance with the different reference levels which the detected voltage exceeds.

11. An inverter circuit according to claim 10, wherein the non-stabilized DC power supply comprises an AC power supply rectified by a first rectifier without smoothing to produce the non-stabilized DC voltage.

12. An inverter circuit according to claim 11 further including means to generate the externally applied control signals to the first and second thyristors comprising:

a second rectifier coupled to the AC source to produce a DC voltage;

an oscillator coupled to the DC voltage output of said second rectifier;

a differentiation circuit coupled to the output of the oscillator;

a flip-flop circuit coupled to the output of the differentiation circuit to produce alternating output signals; and first and second thyristor drivers coupled between the flip-flop circuit and the first and second thyristors, respectively, to alternately make the first and second thyristors conductive at a frequency which is half of the frequency of the oscillator.

* * * * *